United States Patent [19]

Nardini

[11] 4,357,074
[45] Nov. 2, 1982

[54] METHOD AND DEVICE FOR DOUSING SUNLIGHT WITH A SEASONAL EFFECT

[76] Inventor: Gian V. Nardini, Via Chiocciola 53, 22060 Carimate (Como), Italy

[21] Appl. No.: 173,146

[22] Filed: Jul. 28, 1980

[30] Foreign Application Priority Data

Aug. 6, 1979 [IT]  Italy ............................. 24943 A/79

[51] Int. Cl.³ ...................... G02B 17/00; G02B 27/00
[52] U.S. Cl. .................................... 350/259; 350/265
[58] Field of Search ................................. 350/258–265

[56] References Cited

U.S. PATENT DOCUMENTS 2,993,409  7/1961  Boyd .................................... 350/262
3,255,655  6/1966  Weiher et al. ....................... 350/262
3,471,221 10/1969  Seeger ............................. 350/265 X
4,227,774 10/1980  Corll ............................... 350/259 X Primary Examiner—Richard A. Wintercorn
Attorney, Agent, or Firm—McAulay, Fields, Fisher, Goldstein & Nissen

[57] ABSTRACT

A dousing or light blocking method and device for controlling the transmission of sunlight includes a plate of transparent material, having one flat, vertical or nearly vertical, surface and an opposite at least partially inclined surface, the latter facing the sun. The plate is oriented and located with respect to the sun in a predetermined period of the sun path, so as to prevent direct sunlight from getting through the plate in a desired and predetermined year season or period without interfering with the transmission of diffused light.

14 Claims, 8 Drawing Figures

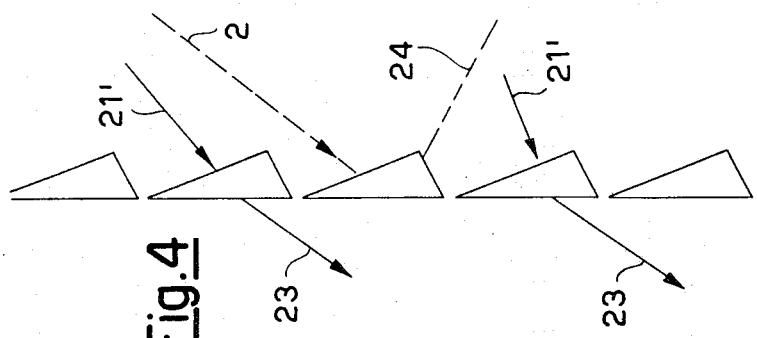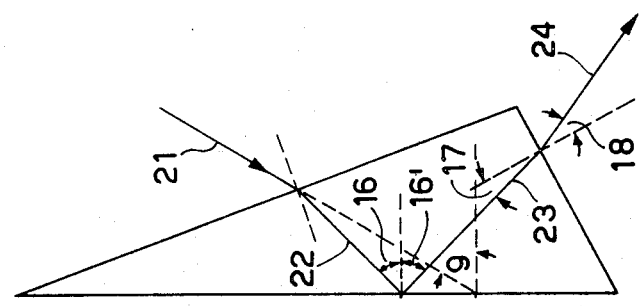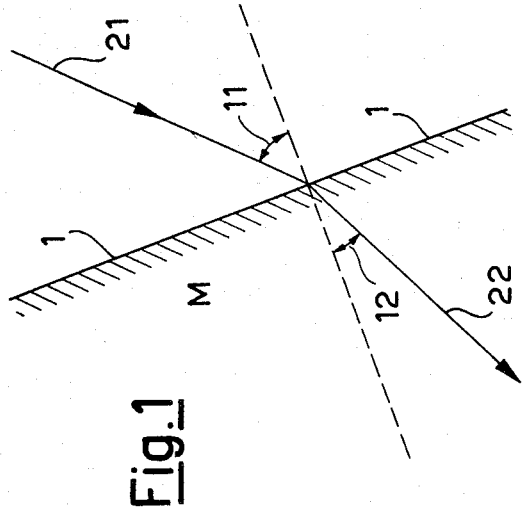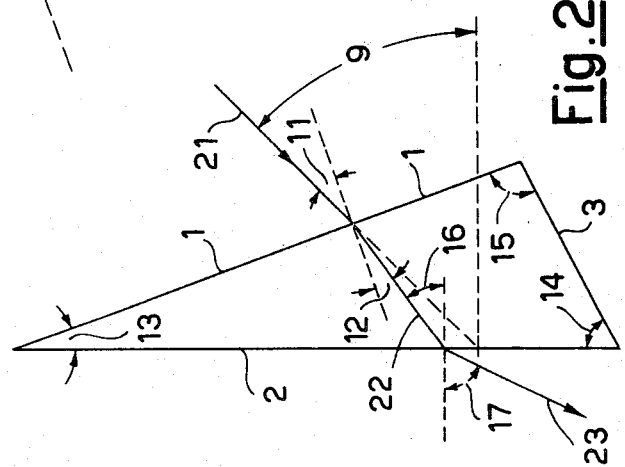

METHOD AND DEVICE FOR DOUSING SUNLIGHT WITH A SEASONAL EFFECT

BACKGROUND OF THE INVENTION

This invention concerns a class of devices that behave, with respect to sunlight, in such a way as to be helpful for controlling the internal climate or buildings. More precisely, this invention concerns devices that behave as transparent screens during winter time, thus allowing the building, that they define and protect, to receive the full power of the incoming sunlight, and to convert it into useful heat. During summertime, on the contrary, said screens will act as dousers or light blocking devices which totally reject direct sunlight, thus helping towards a considerable reduction of the heat load of the air conditioning plant of said building.

Greenhouses are a special class of buildings that can derive an advantage from using this invention: these structures are designed to capture and retain as much solar energy as possible during wintertime, but they tend to become overheated in summertime, which may damage plants. It is thus customary to cover greenhouses with laths during summertime, or to whitewash their glass covers which will make them less transparent, or to remove them altogether.

On the contrary, by using this invention one can avoid any manual or mechanical operation, since the task of admitting or rejecting solar energy according to the needs of the season is entirely taken up by the optical properties of the covering douser, that will be set up in such a proper way as to fit the various positions of the sun in the different seasons. The physical phenomenon of total reflection of light is well known. It can be observed in all transparent materials, including in particular those known and commonly used in buildings, such as window-glass, an organic glass called plexigas, which is a polymer of methyl-methacrylate, or other materials. In order to practically produce total reflection of light beams, one must use a transparent medium with an index of refraction different from that of the air through which sunlight beams reach the earth surface. Usually available media exhibit refraction indices that are much greater than that of air. It is a usual convention to take as unity the refraction value of the latter, in which case the ratio between the index of refraction of any medium considered and that of air is usually called n. A typical value of n for ordinary window glass is 1.52. However, other glasses with different compositions can exhibit n values as low as 1.45 or even as high as 1.95. Among transparent materials commonly used in buildings, n is 1.49 for plexiglas, 1.53 for vinyl chloride polymer (PVC), 1.586 for polycarbonate, between 1.59 and 1.66 for polystyrene and 1.333 for liquid water. Total reflection cannot be observed in ordinary flat plates with smooth parallel surfaces. It is observed instead, and is well known, in prisms which are used in optics, and is also used, however roughly and with little scientific elaboration, in the so-called "pressed" glass plates, having a frosted, lined, corrugated or otherwise deformed surface, in order to diminish their clarity to the sight. The above described directional properties belong in fact to prisms in general and to surfaces that are shaped like a plurality of prisms. The idea of putting said directional properties to use in connection with the known fact that the sun occupies different, but very precisely defined positions in the sky throughout the year, is however not yet known, and is the basis of the present invention.

OBJECTS AND SUMMARY OF THE INVENTION

It is the main object of this invention to produce a selective effect on the amount of solar radiation admitted according to the various seasons. It is more specific object of this invention to provide a dousing or light blocking method and a related douser for light beams, in particular for sunlight beams, that, according to the direction they come from, will and can prevent said beams from getting through, while not keeping diffuse light from passing through the douser. It is another object of this invention to provide a sunlight dousing method and device that will operate automatically and without any control operation, under prescribed conditions (as, for instance, the time of the year or the direction of sunlight beams), but that will also be substantially transparent to said beams when conditions are different from those for which dousing is required. Said objects are fulfilled by a dousing method and device for light beams, in particular sunlight beams, having a given direction, which comprises a plate of a transparent material defined by two surfaces, said transparent material having an index of refraction greater than unity and a resulting critical angle of total reflection, characterized by the fact that one of said surfaces is at least partly inclined with respect to the plane of the other surface by such an angle that any light beam, on crossing said inclined part, will experience total internal reflection, on the second surface it will meet on its path so as to be prevented from completely crossing said plate, the second surface being vertical or nearly vertical. To put it more specifically, the dousing method and douser according to this invention will have at least a part of one of said surfaces inclined by such an angle that the beam refracted by said inclined part of the first surface hit by the incident beam will then hit the second surface at an angle greater than said critical angle (said angle being measured between said refracted beam and the normal to said second surface). In the preferred embodiment of the douser according to this invention, it consists of a plate of a transparent material, having one flat, vertical or nearly vertical, smooth surface, and its other surface shaped in the form of a plurality of adjacent prisms, integral within said surface, each one of said prisms having one flat face inclined by an angle b with respect to said flat surface, said angle b being chosen after determining in the plane normal to the solid corner b the direction of sunlight beams for which dousing is desired, so as to comply with the following relationship: $\sin(a-b) = n \cdot \sin(c-b)$, where n is the index of refraction of the transparent material of the plate, c is the critical angle of total reflection, a is the angle between the pre-determined direction of the light beam and the normal to the second face hit by said beam.

BRIEF DESCRIPTION OF THE DRAWINGS

The peculiar features and advantages of this invention will appear more clearly from the following description and examples, both being related to the drawings joined herewith, wherein:

FIG. 1 shows the angular relationship affecting the refraction of a light beam upon crossing the surface that divides two media having different refraction indexes;

FIG. 2 and 3 show schematically the conditions of either transparency or total reflection in which a prismatic element may respectively find itself with respect to a light beam;

FIG. 4 shows, also in a schematic form, a first embodiment of the douser according to the invention:

DETAILED DESCRIPTION OF THE PREFERRED EMBODIMENT

Figure 8:
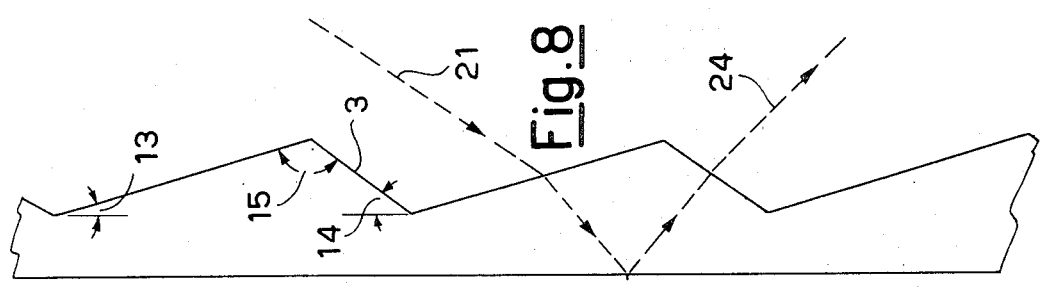
FIG. 5 to 8 show, again in a schematic and simplified form, other embodiments of the invention and their respective optical explanations.
Figure 7:
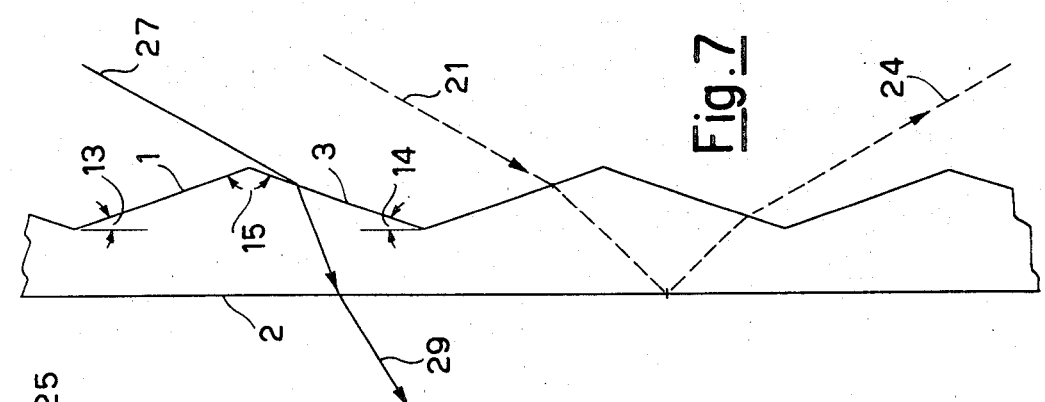
Figure 6:
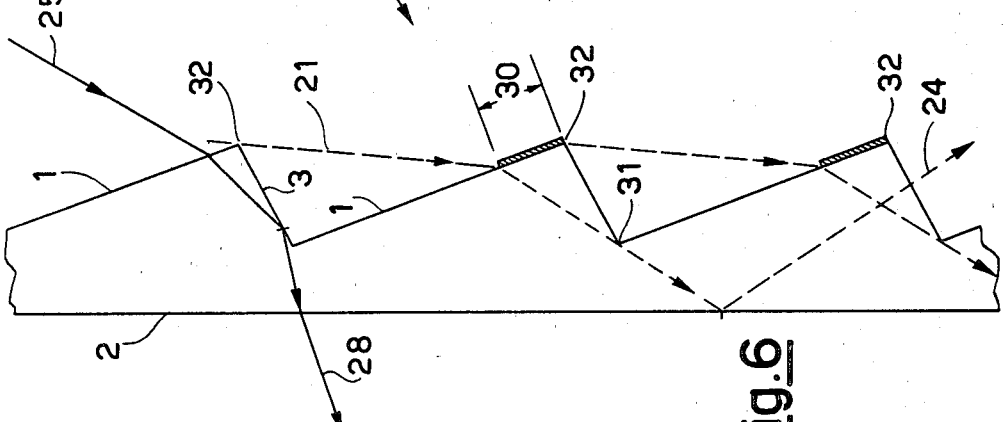
Figure 5:
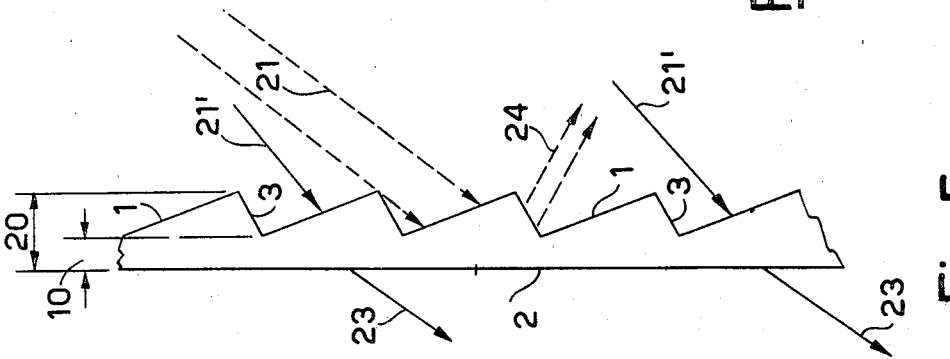

Referring to FIG. 1, the incident beam (21) proceeding through air, will turn, upon refraction through surface (1) into a refracted beam (22) that proceeds through a medium (M) having an index of refraction n. Between angles (11) and (12) formed respectively by both beams with the normal to the surface in the point of incidence, the following known relationship obtains (Snell's law): n sin (11)=sin (12). Whenever beam (22) proceeds in a direction contrary to that shown by the arrows, thus reaching the surface from within the medium having refraction index n, it will produce in the air a refracted beam having the same inclination as beam (21), but in the opposite direction, provided that angle (12) is smaller than the critical angle c that is defined by the known relationship sin (c)=1/n. Whenever this critical angle c is exceeded, total internal reflection occurs. For ordinary window glass, n=1.52 and critical angle c amounts to 41°10′ (41 sexagesimal degrees and 10 primes of arc). FIG. 2 again shows beam (21) that, upon refraction through face (1) of a prism, turns into beam (22). The latter hits face (2) of the same prism at an angle (16) smaller than the critical angle, and continues on as beam (23). The incoming light is thus transmitted through the prism. Let us define the inclination of beam (21) as angle (9) between said beam and the normal to face (2). Upon increasing said inclination, angles (11), (12) and (16) will also increase, until angle 16 becomes greater than the critical angle c. At this point, the condition of FIG. 3 will set in, id est, beam (22), instead of following, after refraction, a path beyond face (2), will be reflected by the latter at an angle (16′) equal to (16) and turn into beam (23), that will then hit face (3) at angle (17). If the latter angle is smaller then the critical angle, just as shown by FIG. 3, the light will then finally appear as beam (24) in the outside air. Having named c the critical angle that characterizes the material, and then naming a the limiting value of inclination (9) of the incident beam (21) with respect to the second face (2) of the prism, then b is the solid angle (13) between faces (1) and (2), in order to have said critical value a set the limit between the conditions of FIG. 2 and FIG. 3, said values are connected by the previously mentioned relationship: sin (a−b)=n.sin (c−b), wherein n is again the index of refraction of the material itself. Let us now assume for instance that a vertical glass wall must be constructed in a location placed at a latitude of 40° North, said glass wall facing South and having the property of letting the sunlight beams through from September 15th until April 1st. At noon on these dates, the altitude of the sun on the horizon is 53°. If a multitude of prisms shaped as in FIGS. 2 and 3 are so placed as to have their second faces (2) arranged to form the plane of the glass wall, one obtains the device shown schematically in FIG. 4. This fulfills the desired purpose, provided the limiting altitude a is indeed 53°. If n amounts of 1.52, one calculates for angle b the value of 20° by means of the above mentioned relationship. One might doubt that the above mentioned effect be only detectable at noon, whereas it might get lost at other times of the day, when the sun is outside the meridian plane. But practical experiment shows, quite surprisingly, that the effect of total reflection is experienced at all times of the day during said period April 1st -September 15th, whereas in the winter period October 15th–March 1st light is transmitted at all times when the sun is visible. During the transition months, i.e. the whole month of March and from September 15th until October 15th, reflection will still set in at both early and late hours of the day, whereas direct sunlight will get through for a few hours around noon e.g. from 10 am to 2 pm on March 22nd; this time interval will then shrink until becoming zero on April 1st; it will then appear again on September 15th, increase to 4 hours on September 23rd, then go on increasing. Said unexpected effect has found indeed a theoretical explanation by means of complex calculations of spherical trigonometry, based on the different astronomical coordinates defining the position of the sun at different times. The above mentioned relationship sin (a−b)=n.sin (c−b) will be found again as the result of said calculations, whenever the latter concern the special case of the sun being in the plane normal to the straight line of intersection of faces (1) and (2), i.e. in the meridian plane if the douser faces south. The douser shown schematically by FIG. 4 has a structure similar to a Venetian blind with horizontal ribs, the latter being however transparent and turning, under certain circumstances, into reflecting ones. Many an application would take advantage, however, from welding said plurality of prisms into a single glass plate, according to a principle used in some lenses and going by the name of Fresnel. One will then obtain a structure of the type shown by FIG. 5. Said latter structure comprises a flat surface on one side, wich results from joining together all faces (2) of the different prisms, whereas its other side is defined by a plurality of prismatic lines or ribs, each of the latter carrying faces that can be recognized as faces (1) and (3) of an individual prism. In order to obtain the desired effect, said douser shall be installed with its flat surface vertical and its lined surface turning towards the sun. The pitch of the lines depends on the molding depth which in turn depends on the technological requirements of the production process. Said depth is measured as the ratio between the minimum thickness (10) and the maximum thickness (20) of the plate to be measured respectively at the hollow and solid corners of the lines or ribs. It is preferable, for technological reasons, to choose said ratio somewhere between the values 1:2 and 9:10, a typical but by no means binding value being 5:6. One must pay special attention in choosing angle (14), defined between the planes of faces (3) and (2) respectively. For example, referring to FIG. 6, one may arbitrarily choose the value of 60° for angle (14) of a douser whose angle (13) amounts to 20° as calculated above. One will then remark that beams (25), in spite of their being more inclined than 53°, when hitting a rib near solid corner (32), will produce a refracted beam hitting face (3) from within under conditions of total reflection; it will then reach face (2) with too small an inclination for it to be rejected and, in the end, will enter the building as beam (28). If the light transmission due to this phenomenon is undesired, it can be avoided by blinding with black paint or with other known opaque means a part of face (1) of each line or rib, i.e. a strip of width (30) ending at solid corner (32). Said width (30) of the blind strip should amount to 23% of the width of face (1); this results from examining, as shown by same FIG. 6, the borderline case wherein beam (21) is almost vertical and rises to solid corner (32) of the previous rib, then hits from within, as a result of refraction, face (3) near hollow corner (31). However one will diminish as well, by so doing, the quantity of light transmitted in wintertime. Although some loss of light may be deemed acceptable in most cases, one may also suggest a compromise solution by halving the width of the blind strip. The sunlight lost in wintertime can be reduced to around 10%, while, on the other hand, the undesired sunlight transmitted in summertime will most often remain below 10% as well. Nevertheless, one may indeed prefer to avoid any loss of solar energy available in wintertime, albeit accepting a temporary reduction of the summer effect of total reflection or a shorter period for it to take place. These possibilities are made clear by both following examples (FIGS. 7 and 8). Let us refer to a plate shaped as shown by FIG. 7, wherein both angles (13) and (14) amount to 20°. This profile prevents undesired light getting through as beam (28), since angle (15) amounts to 140° thus being larger than the sum of the critical angle of 41°10′+90°. As a result, it can contain the refracted beam (22 of FIG. 1), whatever the inclination of the incident beam (21) including the case when the latter nearly parallels face (1). One does not need blind strip (30) in this case and all loss of winter energy is prevented. However, during a part of the summer period when sunlight hitting faces (1) is rejected, faces (3) will be exposed to the incident sunlight as well, because of their strong inclination: beam (27) on hitting them cannot be rejected, but will instead cross the plate and enter the building as beam (29). This condition only obtains at the beginning and at the end of the summer period, when the incident beams, already more inclined than the limiting altitude where reflection starts, are not yet as inclined as face (3) whose shape is, by construction, $(90° - 20°) = 70°$ above the horizon. When assuming that the index of refraction of the material of the plate is 1.52, and that the summer effect thus sets in, at a latitude of 40° north, between April 1st and September 15th, the plate having the profile of FIG. 7 will admit all direct sunlight hitting it at noon on March 22nd, only 24% of it (owing to beams (27)–(29)) at noon on April 1st, none at all from May 1st to July 23rd, and will then resume up to 24% at noon on Septemper 23rd. Finally, referring to FIG. 8, if angles (13) and (14) are so determined that, on the one hand, face (3) is exactly parallel to the limiting altitude of sunlight beams, whereas, on the other hand, angle (15), that is supplementary to the sum of $(13)+(14)$, exactly equals 90° + the critical angle of total reflection, and if the material used is still glass with $n = 1.52$, the critical angle is 41′10′ so that $(13) = 15°30'$, $(14) = 33°20'$. The limiting altitude is thus determined as $(90° - 33°20') = 56°40'$ above the horizon. At a latitude of 40° north, the sun will reach this altitude at noon on April 8th and September 5th. Whereas in wintertime sunlight is transmitted without any loss. During the summer interval between said dates, the transmission of direct sunlight is fully prevented. Said previous examples refer to dousers that will transmit sunlight when it hits them normally to the douser plane, or at an inclination smaller than the desired limiting altitude, whereas they will reflect the incoming light whenever its inclination is higher than limiting value. All preceding examples, while showing certain interesting ways in which to use this invention, are obviously by no means limiting. In particular, although the above description explicitly and constantly refers to sunlight beams, it is clear that the invention can be applied to all light radiations with wavelengths comprised between $0.2 \times 10^{-6}$ and $3.0 \times 10^{-6}$ meters. While all examples assume using ordinary window glass with $n = 1.52$, similar results can be obtained by using prisms of materials having refraction indexes different from said value; enough optics to do the necessary calculations in within the knowledge of the expert of the art. The invention has been shown to apply to vertical glass walls; one can obviously obtain appropriate solutions even for walls having nearly vertical slopes; although all examples assumed, for ease of understanding, the douser to face full south (in the northern hemisphere), it is possible to obtain a seasonal effect even for dousers turned differently, and even for non-horizontal prismatic lines, in particular vertical ones. The inclinations of faces are to be calculated acording to each different case; finally, the latitude of 40° north, that has been mentioned in all examples for ease of comparison and understanding, may vary within wide limits, while still maintaining the advantages of using the invention. It is even important to remark that the shapes and proportions of the prismatic-lined plates, as shown in the different examples, may remain unchanged even at a higher latitude, will reject the incoming sunlight for a shorter period, and the limiting dates of this summer period will tend to approach each other; conversely, said dates will move further apart, and the summer period will get longer, when installing the same douser at a lower latitude, id est closer to the equator. Since they will immediately comply with the seasonal requirements of very different locations, very few prismatic rib profiles are required for the dousers; thus manufacturing and keeping them in store becomes an easy matter.

I claim:

1. A method for seasonally dousing sunlight, comprising:

forming a transparent douser plate of a material having an index of refraction greater than unity and with a critical angle of internal reflection;

forming at least one first plane surface on said transparent douser plate;

forming at least one second plane surface on said transparent douser plate;

said at least one first plane surface and said at least one second plane surface being inclined at an inclined angle with respect to each other;

said index of refraction and said inclined angle being effective to cause light entering said douser plate from at least some directions through said first plane surface to become incident onto said second plane surface at angles equal to or exceeding said critical angle;

positioning said second plane surface substantially vertical and disposing said at least said one first plane surface facing the sun substantially at noon time and at said inclined angle with respect to said second plane surface whereby the sun altitude corresponding to the said directions which produce said critical angle for direct sunlight is a limiting altitude of the sun, and direct sunlight is blocked for sun altitudes above said limiting value and direct sunlight is transmitting through said douser plate for at least some sun azimuths for sun altitudes below said limiting value.

2. The method of claim 1, wherein the inclined angle is identified as b, and the angle b is chosen to satisfy the following relationship $$\sin(a-b) = n \sin(c-b)$$

where
n = index of refraction
c = critical angle
a = limiting altitude of the sun.

3. A fixed douser for seasonally dousing sunlight, comprising:
a transparent douser plate of a material having an index of refraction greater than unity and, as a result, a critical angle of total internal refraction;
said transparent douser plate having at least one first plane surface and one second plane surface, said first plane surface and second plane surface being inclined at an inclined angle with respect to each other;
said index of refraction and said inclined angle being effective to cause the light entering said douser plate from at least some directions through said first plane surface to become incident onto said second plane surface at angles equal to or exceeding said critical angle;
said second plane surface being substantially vertical; and
said at least said one first plane surface facing the sun substantially at noon time and being disposed at said angle with respect to said at least said one second plane surface, whereby the sun altitude corresponding to said directions which produce said critical angle for direct sunlight is a limiting altitude of the sun, and direct sunlight is blocked for sun altitudes above said limiting value and direct sunlight is transmitted through said douser plate for at least some sun azimuths for sun altitudes above said limiting value and direct sunlight is transmitted through said douser plate for at least some sun azimuths for sun altitudes below said limiting value.

4. A fixed douser according to claim 3, wherein said inclined angle is identified a b and said angle b satisifies the following relationship:

$$\sin(a-b) = n \sin(c-b)$$

where
n = index of refraction
c = critical angle
a = limiting altitude of the sun.

5. A fixed douser according to claim 4, wherein said at least one first plane surface includes a plurality of first plane surfaces and said first plane surfaces are all parallel to one another and are bounded by substantially horizontal parallel lines.

6. A fixed douser according to claim 5, wherein said plurality of first plane surfaces define a plurality of adjacent prismatic elements or ribs and each rib has a solid corner between its first plane surface and a third surface.

7. A fixed douser according to claim 6, wherein said third surface of each of said prismatic elements or ribs is a plane, so that each of said prismatic elements or ribs has a substantially triangular cross section.

8. A fixed douser according to claim 7, wherein a solid angle between faces of said first and third plane surfaces in each of said prismatic ribs is at least as great as a sum of said critical angle and 90 degrees.

9. A fixed douser according to claim 7, wherein all said third plane surfaces are parallel to the direction to the sun at said limiting altitude.

10. A fixed douser according to claim 6, wherein said douser plate includes a ratio of minimum thickness of from about 1 to 2 to about 9 to 10.

11. A fixed douser according to claim 10, wherein said ratio is 5 to 6.

12. A fixed douser according to claim 3, wherein said at least one first plane surface includes a plurality of plane surfaces each forming with said second plane surface a prism, all of said prisms having the same orientation.

13. A fixed douser according to claim 3, wherein said limiting altitude is equal to the altitude reached by the sun on dates in spring and fall corresponding to dates when changeover between artificial winter heating and summer non-heating is required.

14. A fixed douser according to claim 13, wherein said limiting altitude is at least 50 degrees.

* * * * *